(12) United States Patent
Sakaguchi

(10) Patent No.: US 6,896,182 B2
(45) Date of Patent: May 24, 2005

(54) CARD VERIFICATION SYSTEM AND CARD VERIFICATION METHOD

(75) Inventor: Ikuo Sakaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 169 days.

(21) Appl. No.: 09/923,536

(22) Filed: Aug. 8, 2001

(65) Prior Publication Data

US 2002/0020741 A1 Feb. 21, 2002

(30) Foreign Application Priority Data

Aug. 10, 2000 (JP) ........................................ 2000-242439

(51) Int. Cl.$^7$ ............................................... G06K 5/00
(52) U.S. Cl. ..................................................... 235/380
(58) Field of Search ................................ 235/380–382, 235/375, 379, 487, 393, 394; 705/64, 75, 13, 44, 40, 39, 42; 455/404.2, 410; 379/118, 114.15, 91.01, 114.14, 144, 441, 91; 340/5.6, 5.8, 7.52; 465/417, 456, 410, 462, 465

(56) References Cited

U.S. PATENT DOCUMENTS

| | | | | |
|---|---|---|---|---|
| 5,064,999 A | * | 11/1991 | Okamoto et al. | 235/379 |
| 5,099,512 A | * | 3/1992 | Shigami et al. | 379/357.01 |
| 5,266,782 A | * | 11/1993 | Alanara et al. | 235/380 |
| 5,388,148 A | * | 2/1995 | Seiderman | 455/404 |
| 5,502,759 A | * | 3/1996 | Cheng et al. | 379/88.02 |
| 5,550,897 A | * | 8/1996 | Seiderman | 455/558 |
| 5,608,781 A | * | 3/1997 | Seiderman | 455/410 |
| 5,655,007 A | * | 8/1997 | McAllister | 379/91.01 |
| 5,867,821 A | * | 2/1999 | Ballantyne et al. | 705/2 |
| 5,878,337 A | | 3/1999 | Joao et al. | |
| 5,878,399 A | * | 3/1999 | Peralto | 235/386 |
| 5,903,830 A | * | 5/1999 | Joao et al. | 455/406 |
| 5,991,749 A | * | 11/1999 | Morrill, Jr. | 705/44 |
| 6,199,761 B1 | * | 3/2001 | Drexler | 235/487 |
| 6,233,448 B1 | * | 5/2001 | Alperovich et al. | 455/417 |
| 6,259,405 B1 | * | 7/2001 | Stewart et al. | 342/457 |
| 6,317,650 B1 | * | 11/2001 | Powell et al. | 235/380 |
| 6,442,532 B1 | * | 8/2002 | Kawan | 705/35 |
| 6,454,165 B1 | * | 9/2002 | Dawson | 235/381 |
| 6,466,780 B1 | * | 10/2002 | Geiselman et al. | 455/411 |
| 6,612,488 B2 | * | 9/2003 | Suzuki | 235/380 |

FOREIGN PATENT DOCUMENTS

| | | |
|---|---|---|
| CN | 1113368 A | 12/1995 |
| EP | 0 848 360 A1 | 6/1998 |
| FR | 2 792 143 | 10/2000 |
| GB | 2 328 309 A | 2/1999 |
| JP | 01-95361 | 4/1989 |
| JP | 08-87655 | 4/1996 |
| JP | 09-231285 | 9/1997 |
| JP | 10-40321 | 2/1998 |
| JP | 10-91866 | 4/1998 |
| JP | 10-143570 | 5/1998 |
| JP | H10-198636 A | 7/1998 |
| JP | 11-500550 | 1/1999 |
| JP | 11-150608 | 6/1999 |
| JP | 11-184947 | 7/1999 |
| JP | 11-203358 | 7/1999 |
| JP | 11-259573 | 9/1999 |
| JP | 2000-106694 | 4/2000 |
| JP | 2000-113393 A | 4/2000 |
| WO | WO 98/47113 | 10/1998 |
| WO | WO 01/88790 A1 | 11/2001 |

* cited by examiner

*Primary Examiner*—Thien M. Le
*Assistant Examiner*—Edwyn Labaze
(74) *Attorney, Agent, or Firm*—Sughrue Mion, PLLC

(57) ABSTRACT

A card verification system in which a card identification code is registered. A read unit reads the card identification code from the card. A verification apparatus verifies the card only when an existing place of the read unit belongs to an area corresponding to the card identification code. The card is a card used for settlement, and is used when the card identification code is read by the read unit. The use place of the card is coincident with the existing place of the read unit. By adding the use place of the card to a verification condition of the card, unjust use of the card can be prevented.

13 Claims, 1 Drawing Sheet

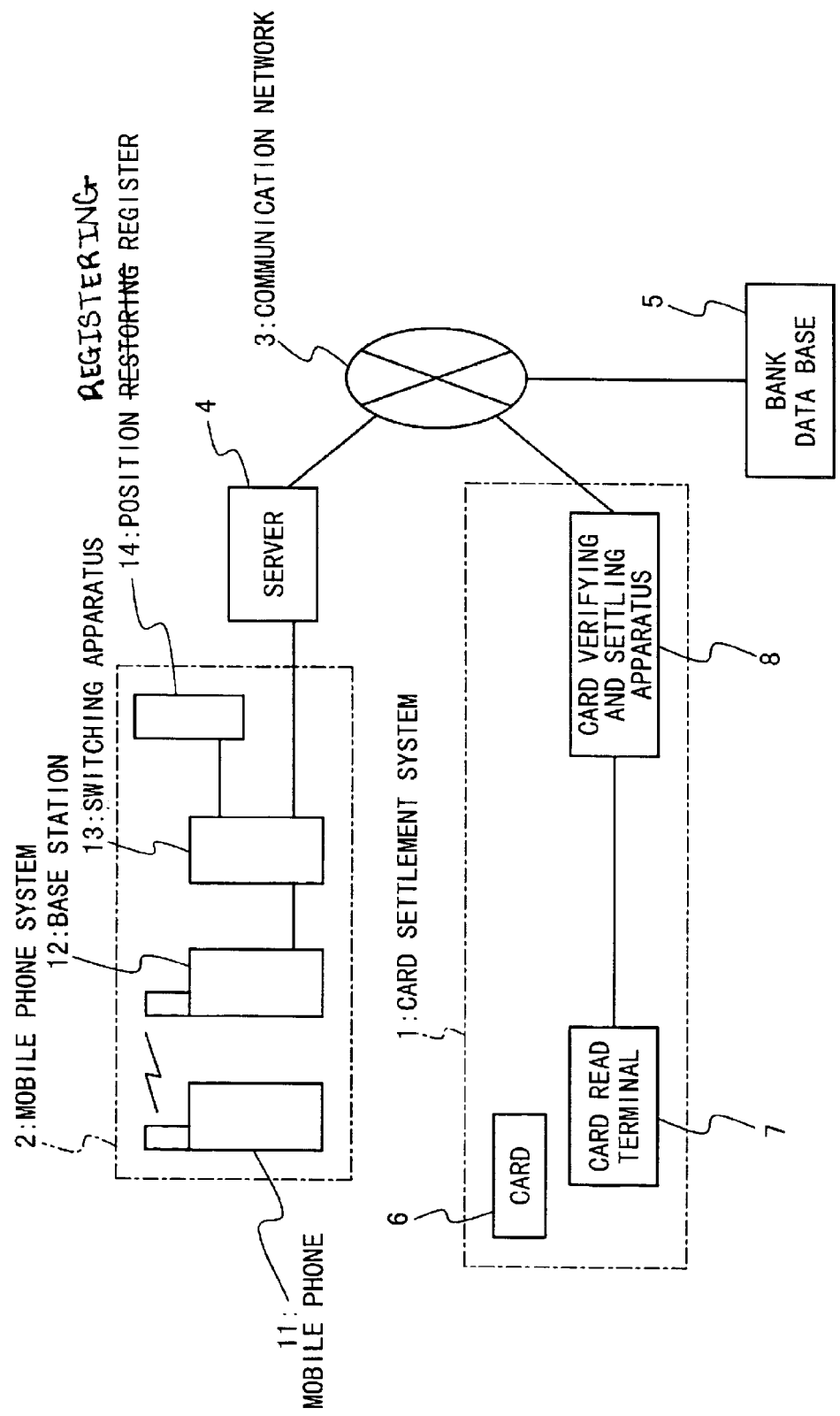

CARD VERIFICATION SYSTEM AND CARD VERIFICATION METHOD

BACKGROUND OF THE INVENTION

1. Field of the Invention

The present invention relates to a card verification system and a card verification method, and more particularly a card verification system and a card verification method capable of avoiding unjust use of a card by a third person more surely.

2. Description of the Related Art

The purchase and payment using a credit card are widely carried out. Conventionally, in case of purchasing service and goods, the owner of the card shows the card and signs. Thus, the use of the card is authenticated and the settlement using the card is carried out.

In the authentication by such a signature, it is difficult to prevent unjust use of a third person through copy, picking, and burglary. When the card is stolen or lost, i.e., the card is possibly used unjust by the third person, the card owner can stop the use of the card by declaring to a card management company and carrying out a procedure of the temporary stop of the card use. For this process, the card owner must submit a damage form in case of burglary and a card loss form in case of loss to the police station and it is not easy.

It is necessary to specify a cell or a small number of cells where there is a possibility that a mobile phone is present when a mobile phone system calls the mobile phone. Therefore, a service area is divided into a plurality of areas and a switching apparatus registers the area where each mobile phone is present. The mobile phone system originates a call only in the area where the mobile phone is present.

In conjunction with the above description, an information processing system is disclosed in Japanese Laid Open Patent Application (JP-A-Heisei 8-87655). In this information processing system, radio communication is carried out between a provision unit which provides article or a service, a mobile phone of a user, and a financial institution with which the user has dealings, so that the user receives the provision of the article or the service and carries out payment for the price of the article or service. The mobile phone is composed of a first request section for requesting the provision of the article or service to the provision unit. The provision unit is composed of a notifying section which notifies the price of the article or service to the mobile phone in response to the request from the first request section. The mobile phone is composed of a second request section which request the settlement processing of the price to the financial institution for user dealings in response to the notice from the notifying section.

Also, a multimedia home electronic settlement terminal is disclosed in Japanese Laid Open Patent application (JP-A-Heisei 9-231285). In this reference, the multimedia home electronic settlement terminal is composed of the Internet and a communication interface which accesses a mobile radio network, a modem (23), an IC card reader (25), a printer (26), a display (27), a keyboard (28), an external device interface (29), a telephone receptacle (21), a controller (24), a telephone (21), and an external interface (29).

Also, a race ticket purchasing and adjusting system is disclosed in Japanese Laid Open Patent application (JP-A-Heisei 10-40321). The race ticket purchasing and adjusting system is composed of an IC card, a terminal and a management unit which is installed in a race place. The terminal is composed of a card attachment section for a IC card, a communication section which carries out data communication by the management unit and a public communication network, an input section for inputting the data of a desired race vote ticket, a display section for displaying the data inputted by the input section, data about a relayed image of the race and data of the race sent from the management unit, and data in the IC card, and a selecting section for selecting the image and the data to be requested to the management unit. The management unit is composed of a communication section for carrying out data communication by the terminal and the public communication network, a first camera for picking up the race, a second camera for picking up participation before the race, and a file section which stores data about the race. The management unit accepts the purchase of the desired race ticket from the terminal and the purchase data is stored in the file section. Electronic money in the IC card is transmitted from the terminal to the management unit to purchase the race ticket. After the race ends, the purchase data of the race ticket in the IC card is transmitted from the terminal to the management unit. When it is confirmed that the purchase data exists in the file section in the center, electronic money for the pay out corresponding to the purchase data is transmitted from the management unit to the terminal and is stored in the IC card.

Also, an electronic money dealing system is disclosed in Japanese Laid Open Patent application (JP-A-Heisei 10-91866). The electronic money dealing system is composed of an IC card in which electronic money information is stored, a terminal section which reads or writes information of the IC card, a communication section which carries out transmission and reception of the electronic information from the terminal section, an electronic money storage section in which electronic money of electronic information transmitted and received through the communication section can be recorded at least, and an electronic money supplying unit which operates in response to a signal from the electronic money storage section. The communication section connected with the terminal section is regarded as a radio phone unit which transmits and receives electronic information using electromagnetic wave, and the electronic money is exchanged through the electromagnetic wave with the radio phone unit.

Also, an electronic delivery method of personal information of credit card is disclosed in Japanese Laid Open Patent application (JP-A-Heisei 10-143570). The credit verification is automatically inquired to an information center of a card issuance company based on an identification number inputted by the card user and information electronically read out from an IC card in which stores the card issuance company, a card number and personal information of a card user are stored.

Also, a pre-paid card type mobile phone is disclosed in Japanese Laid Open Patent application (JP-A-Heisei 11-150608). In this reference, an IC card reader for a pre-paid card is provided to a mobile phone. Communication is carried out using the pre-paid card. A communication charge is reduced every time the mobile phone is used. Thus, unjust use of the mobile phone is prevented by employing a pre-paid system.

Also, a mobile phone terminal which can input and output electronic value is disclosed in Japanese Laid Open Patent application (JP-A-Heisei 11-184947). The mobile phone terminal has a memory which can store electronic value. The electronic value is filled by a transfer source or is paid to the transfer source.

Also, a verification and settlement method using a portable terminal unit is disclosed in Japanese Laid Open Patent application (JP-A-Heisei 11-203358). Data communication is carried out with an installation terminal using the portable terminal unit and settlement corresponding to a service is carried out. A memory which cannot be accessed by the portable terminal unit is provided in the portable terminal unit, and settlement data which contains credit data from a finance settlement organization is stored in the memory. The portable terminal unit stores individual recognition data. The settlement data and the individual recognition data are transmitted from the portable terminal unit to the insulation terminal unit. The installation terminal unit verifies the receive data transmitted from the portable terminal unit, and transmits the service data to the portable terminal unit, when the received data is verified.

Also, a verification and settlement apparatus of a credit card is disclosed in Japanese Laid Open Patent application (JP-A-Heisei 11-259573). A communication center with a host computer for the credit card communicates with a credit card terminal in an on-line by a mobile phone or a radio apparatus. More specifically, a credit terminal, a communication adapter, the mobile phone or radio apparatus are combined. A DC-AC inverter, the credit terminal and a communication adapter are connected and a power supply line to the DC-AC inverter is connected to a cigar lighter of an automobile, and the communication adapter is connected to the mobile phone or radio apparatus.

Also, a mobile remote operation point-of-sale terminal is disclosed in Japanese Laid Open Patent Application (JP-A-Heisei 11-500550). In an accounting system (10), a portable radio accounting terminal (20) is provided in which a user inputs transaction data of dealings using keypad (52), a UPC bar code of the goods is read by a CCD sensor, a credit card, a debit card and a smart card of the user can be read. The portable radio accounting terminal (20) transmits the dealings and card data to a central network controller (12) via a radio communication network. The central network controller (12) transmits to the host computer in the accounting facilities which processes the card data and the dealings in real time in order. The accounting facilities sends back confirmation data to the central network controller 12 and send back to the radio accounting terminal via the radio communication network. Thus, the radio accounting terminal issues the printed receipt of the dealings to the user.

Also, a radio communications system is disclosed in Japanese laid Open Patent application (P2000-106694A). In the radio communication system, a radio communication apparatus electronically charges a fee through a verification station for verifying a user. The radio communication apparatus is composed of an electronically charging fee section for storing electronically charged fee data inputted and outputted in a memory. A power supply section supplies power to the electronic charged fee section. A detection section detects whether or not the power is supplied to the electronically charged fee section by the power supply section. A verification control section sends out electronically charged fee data to the verification station when the power is supplied to the electronically charged fee section.

Also, a debit and credit card terminal is disclosed in Japanese Laid Open Patent Application (JP-A-Heisei 1-95361). In the reference, the terminal is movable between the first position and the second position. In the terminal, a credit process section carries out a credit card process, and a debit process section carries out a debit card process. A detecting section detects that the terminal is in the first position or the second position. A process control section drives the credit process section or the debit process section in response to the detection result.

Also, a mobile electronic commerce system is disclosed in Laid Open International Patent Application (WO 99/09502). Electronic money is transmitted from a money service provider section into an electric card. When the electric card is used, a service is provided from a service provider and settlement is carried out. Data of settlement is transmitted to the money service provider section at a predetermining timing. Each card has a program peculiar to the card, and a verification which shows that the card is registered, in addition to data shown to the service provider.

SUMMARY OF THE INVENTION

Therefore, an object of the present invention is to provide a card verification system and a card verification method in which the unjust use of a card by a third person can be avoided more surely.

Another object of the present invention is to provide a card verification system and a card verification method, in which a usable area of a card is restricted so that the unjust use of a card can be avoided more surely.

Still another object of the present invention is to provide a card verification system and a card verification method, in which a usable period of a card is restricted so that the unjust use of a card can be avoided more surely.

Yet still another object of the present invention is to provide a card verification system and a card verification method, in which the use of a card can be easily stopped.

It is also an object of the present invention to provide a card verification system and a card verification method in which the stop of the use of the card can be easily canceled.

A card verification system of the present invention is composed of a card on which a card identification code is registered. A read unit reads the card identification code from the card. A verification apparatus verifies the card only when an existing place of the read unit belongs to an area corresponding to the card identification code. The card is a card used for settlement, and is used when the card identification code is read by the read unit. The use place of the card is coincident with the existing place of the read unit. By adding the use place of the card to a verification condition of the card, unjust use of the card can prevented.

The read unit has a read unit identification code, and notifies the read unit identification code to the verification apparatus. The verification apparatus has a table which shows a correspondence relation between the read unit identification code and the existing place, and searches and acquires the existing place corresponding to the notified read unit identification code from the table. In this way, it is desirable in reduction of the load of the read unit to acquire the existing place of the read unit.

The card verification system may be further composed of a mobile phone. The verification apparatus has another table which shows a correspondence relation between the card identification code and the mobile phone, and the area is coincident with an area of one or more cells of a base station to which the mobile phone belongs.

The card verification system may be further composed of a recorder in which the area corresponding to the mobile phone is recorded. The verification apparatus acquires the area from the recorder.

A user of the mobile phone deletes the area from the recorder by operating the mobile phone. The verification apparatus does not verify the card when the area is not recorded in the recorder. The user of the card can interrupts the use of the card without declaration of the interruption of the card to a card management company. It is desirable that the card is a credit card.

A card verification method of the present invention uses a card verification system which comprises a card that a card identification code is registered, a read unit which reads the card identification code from the card, and a verification apparatus which verifies the card only when an existing place of the read unit belongs to an area corresponding to the card identification code. The method is attained by acquiring from the card, an existing place of the read unit which read the card; by acquiring the area from the recorder; by determining whether or not the existing place is in the area; and by prohibiting settlement when the existing place does not belong to the area.

The card verification method may further include the steps of: deleting the recorded area; and when the area is not recorded in the recorder, prohibiting the settlement. The user of the card can interrupt the use of the card without declaration of the interruption of the card to a card management company. It is desirable that the card is a credit card.

BRIEF DESCRIPTION OF THE DRAWINGS

FIG. 1 is a block diagram showing an embodiment of a card verification system of the present invention.

DESCRIPTION OF THE PREFERRED EMBODIMENTS

Referring to the drawings, an embodiment of a card verification system of the present invention is composed of a card settlement system and a mobile phone system. As shown in FIG. 1, the card settlement system 1 is connected with the communication network 3. The mobile phone system 2 is connected with the communication network 3 through a server 4. The card verification system of the present invention is further composed of a bank database 5, and the bank database 5 is connected with the communication network 3.

The mobile phone system 2 is composed of a base station 12, a mobile phone 11 and a switching apparatus 13, and as a typical example, is a system defined in RCR 27. If it is a radio phone system in which it is possible to specify the position of the mobile phone 11, the mobile phone system 2 may be a system other than the system defined in RCR 27 (e.g. PHS system, and so on,). The base station 12 is connected with the switching apparatus 13 and broadcasts notice information repeatedly to the mobile phone 11. A position code is contained in the report information in correspondence to cells of a plurality of base stations or an area composed of a plurality of cells. The mobile phone 11 receives the report information from the base station 12 and recognizes its own position code. The mobile phone 11 transmits a position registration signal to the switching apparatus 13 via the base station 12 through the operation of the mobile phone by the owner and so on. The position registration signal contains a position code and a mobile phone code corresponding to the mobile phone 11. The mobile phone 11 is further composed of a position registration timer and transmits the position registration signal to the switching apparatus 13 every time the position registration timer times out. Moreover, the mobile phone 11 transmits a position registration cancel signal to the switching apparatus 13 in response to an operation of the mobile phone by the owner.

The switching apparatus 13 is composed of a position registration register 14. The position registration register 14 stores a table composed of the mobile phone code and the position code. The switching apparatus 13 registers the mobile phone code and the position code on the position registration register 14 in response to the position registration signal from the mobile phone 11 and deletes the registered mobile phone code and position code in response to the position registration cancel signal. The switching apparatus 13 receives the mobile phone code from the server 4 and returns the position code corresponding to the mobile phone code.

The server 4 has the table composed of the position code and the position information. The position information is a place name/area name, latitude/longitude, a facility name or a corresponding code (hereinafter, to be referred to as "the area name and so on"). The server 4 acquires the position code from the switching apparatus 13 in response to an inquiry about the position information of the mobile phone 11 from the card verification settlement unit 8 and converts the position code into the area name and so on and then returns to the card verification settlement unit 8.

The bank database 5 stores settlement data and stores the settlement data transmitted from the card verification settlement unit 8.

The card settlement system 1 is composed of a card 6, a card read payment terminal 7 and a card verification settlement unit 8. The card 6 is a magnetic card or an IC card, and is a card used for the settlement such as a credit card, a cash card, a debit card, and a pre-paid card. The card 6 has card information. The card information contains a card ID of the card 6 and contains information of balance if the card 6 is a pre-paid card. The card 6 is used by the card user.

The card read payment terminal 7 is composed of a reading section which reads card information from the card 6, an input section for inputting settlement contents and a display section which displays the permission or non-permission of the settlement of the card 6. The card read payment terminal 7 is connected with a card verification settlement unit 8 through a telephone line or a private line. The card read payment terminal 7 reads card information from the card 6, is inputted with the settlement contents by a clerk, and adds the settlement contents to the card information to output them to the card verification settlement unit 6. The settlement contents contain an ID code of the card read payment terminal 7. The card read payment terminal 7 receives the permission or non-permission of the settlement from the card verification settlement unit 8 and displays the permission or non-permission of the settlement on the display section.

The card verification settlement unit 8 has a table in which the ID code of the card read payment terminal 7 corresponds to the place of the card read payment terminal 7. Also, the card verification settlement unit 8 has a table in which the card ID corresponds to the mobile phone code of the mobile phone 11 which the card owner possesses. Thus, the card verification settlement unit 8 has the database in which the settlement contents are recorded.

The card verification settlement unit 8 searches the mobile phone code from the card ID acquired from the card read payment terminal 7 and transmits it to the server 4.

The card verification settlement unit 8 receives the position information from the server 4 and distinguishes between the permission or non-permission of the settlement based on the position information and the place of the card read payment terminal 7. Then, the card verification settlement unit 8 notifies the permission or non permission of the settlement to the card read payment terminal 7 and the card verification settlement unit 8 transmits the settlement contents to the bank database 5 when it is permitted to settle.

The operation of the card verification system of the present invention is composed of a position registration, a position registration cancel, and a card use. The position registration is an operation which registers the position of the mobile phone 11 on the position registration register 14. When the mobile phone owner carries out the operation of the position registration to the mobile phone 11, when a position code is not registered on the mobile phone 11 at the time of the initial stage for turning on, when the position code registered on the mobile phone 11 is not contained in the received notice information, when the network number is changed and roaming is carried out, or when the position registration timer causes the time-out, the position registration is carried out. However, the position registration is not carried out until the operation for the position registration is carried out when the position registration cancellation is carried out by the mobile phone user.

When the position registration is carried out, the mobile phone 11 transmits a recorded mobile phone code and position code to the switching apparatus 13 through the base station 12. The switching apparatus 13 stores and records the mobile phone code and the position code in the position registration register 14.

The position registration cancellation is an operation in which the mobile phone code and the position code recorded in the position registration register 14 are deleted. The position registration cancellation is carried out when the mobile phone owner carries out the operation of the position registration cancellation to the mobile phone 11. The position registration is not carried out until the position registration operation is carried out by the mobile phone owner when the position registration cancellation is operated.

When the position registration cancellation is carried out, the mobile phone 11 transmits the position registration cancellation signal which contains the mobile phone code to the switching apparatus 13. The switching apparatus 13 deletes the position code corresponding to the mobile phone code from the position registration register 14.

The card use is the operation to settle using the card 6. The card user shows the card 6 to the dealer, the dealer clerk uses the card read payment terminal 7 to read a card ID from the card 6 so that the settlement contents are inputted. The card ID is transmitted to the card verification settlement unit 8 together with the settlement contents. The card verification settlement unit 8 searches the mobile phone code corresponding to the card ID and transmits the mobile phone code to the server 4. The server 4 reads the position code corresponding to the searched mobile phone code from the position registration register 14. The server 4 changes a read position code into the area name and transmits it to the card verification settlement unit 8.

When the area name and the place of the card read payment terminal 7 are coincident with each other, the card verification settlement unit 8 notifies the permission of settlement to the card read payment terminal 7, records the settlement contents and transmits the settlement contents to the bank database 5. When the area name acquired by the card verification settlement unit 8 is not coincident with the place of the card read payment terminal 7, the card verification settlement unit 8 discards the settlement contents and notifies non-permission of the settlement to the card read payment terminal 7.

When the corresponding position code is not registered on the position registration register 14 so that the position code cannot be read, i.e., when the position registration cancellation has been carried out, the server 4 notifies that the position registration is canceled, to the card verification settlement unit 8. At this time, the card verification settlement unit 8 discards the settlement contents and notifies non-permission of the settlement to the card read payment terminal 7.

The card read payment terminal 7 displays the message indicating that it is permitted to settle on the display section when the permission of the settlement is notified. The card read payment terminal 7 displays unjust use warning on the display section when the non-permission of the settlement is notified.

According to the card verification system by the present invention, it is made impossible to carry out settlement by use of the card at an area other than the area where there is the mobile phone. As a result, the unjust use of the card by a third person can be prevented. In the card verification system of the present invention, it is possible to interrupt the use of the card through the position registration cancellation by the card owner and to return from the stopping of the use of the card through the position registration by the card owner. Such operation is speedier than a use stop procedure to be made to the card management company and allows the use of the card to be interrupted only during the sleeping hours.

The card verification system of the present invention can prevent unjust use by a third person more surely when settlement is carried out by use of the card.

What is claimed is:

1. A card verification system comprising:
   a card in which a card identification code is registered;
   a read unit configured to read said card identification code from said card; and
   a verification apparatus configured to verify said card only when a place in which said read unit is located, corresponds to said card identification code.

2. The card verification system according to claim 1, wherein said read unit has a read unit identification code, and notifies said read unit identification code to said verification apparatus, and
   said verification apparatus has a table which shows a correspondence relation between said read unit identification code and said place, and searches and acquires said place corresponding to said notified read unit identification code from said table.

3. The card verification system according to claim 2, further comprising a mobile phone,
   said verification apparatus having another table which shows a correspondence relation between said card identification code and said mobile phone, and
   said area being coincident with an area for one or more cells to which said mobile phone belongs.

4. The card verification system according to claim 3, further comprising a storage unit which stores data showing said area corresponding to said mobile phone, and
   said verification apparatus acquiring said area data from said storage unit.

5. The card verification system according to claim 4, wherein a user of said mobile phone deletes said area data from said storage unit by operating said mobile phone, and
   said verification apparatus does not verify said card when said area data is not stored in said storage unit.

6. The card verification system according to claim 1, wherein said card is a credit card.

7. A card verification method using a card verification system which comprises a card in which a card identification code is registered, a read unit which reads said card identification code from said card, and a verification apparatus which verifies said card only when a place in which said read unit is located corresponds to said card identification code, said method comprising:

acquiring from said read unit the place of said read unit which read said card;

acquiring an identification code of said card;

determining whether or not said place of said read unit corresponds to said identification code;

when said place of said read unit does not correspond to said identification code, prohibiting settlement.

8. The card verification method according to claim 7, further comprising:

deleting said area; and when a second area of the card is not a recognized area, prohibiting the settlement.

9. A card verification method comprising:

registering an identification code area comprising an area where a card is located and an identification code of the card;

transmitting over a telecommunication network the identification code area to a verification module, upon request by the verification module;

reading the card identification code from a card by a read unit; and verifying the card only when a location of the read unit corresponds to the identification code area.

10. A method of claim 9, wherein the identification code area is coincident with an area for one or more cells belonging to a mobile telephone, and wherein a verification apparatus accesses a table that shows a correspondence relation between the card identification code and the mobile telephone.

11. A card verification system, comprising:

a position registering module configured to register a geographical place and an identification code of a card;

a verification module configured to receive over a telecommunication network the place and the identification code of the card from said position registering module, and further configured to verify the card read by a card reader requesting card verification only if a location of the card reader corresponds to the identification code of the card.

12. The card verification system according to claim 11, further comprising a mobile phone, and a table showing a correspondence between the identification code of the card and said mobile phone, wherein the area of the card is coincident with an area for one or more cells to which said mobile phone belongs.

13. The card verification system according to claim 11, wherein the card is a credit card.

* * * * *